(12) United States Patent
Park et al.

(10) Patent No.: US 8,306,130 B2
(45) Date of Patent: Nov. 6, 2012

(54) TFI-OFDM TRANSMISSION/RECEPTION SYSTEMS FOR UWB COMMUNICATION AND METHODS THEREOF FOR MITIGATING INTERFERENCE FROM SIMULTANEOUSLY OPERATING PICONETS

(75) Inventors: Seung-young Park, Seoul (KR); Yong-suk Kim, Daejeon (KR); Torbjorn Larsson, San Diego, CA (US); Roberto Aiello, San Diego, CA (US)

(73) Assignees: Samsung Electronics Co., Ltd. (KR); Veebeam Corporation, Burlingame, CA (US)

( * ) Notice: Subject to any disclaimer, the term of this patent is extended or adjusted under 35 U.S.C. 154(b) by 1812 days.

(21) Appl. No.: 10/890,385

(22) Filed: Jul. 14, 2004

(65) Prior Publication Data

US 2005/0047444 A1    Mar. 3, 2005

Related U.S. Application Data

(60) Provisional application No. 60/486,414, filed on Jul. 14, 2003.

(30) Foreign Application Priority Data

Mar. 29, 2004   (KR) .................. 10-2004-0021276

(51) Int. Cl.
*H04K 1/10* (2006.01)
(52) U.S. Cl. ......... 375/260; 375/354; 375/262; 375/341
(58) Field of Classification Search .................. 370/480, 370/254, 366, 330, 207, 69.1; 375/260; 455/59; 714/786, 794, 795
See application file for complete search history.

(56) References Cited

U.S. PATENT DOCUMENTS

| | | | | |
|---|---|---|---|---|
| 6,807,145 B1 * | 10/2004 | Weerackody et al. | ........ | 370/203 |
| 7,149,199 B2 * | 12/2006 | Sung et al. | .................... | 370/330 |
| 7,289,494 B2 * | 10/2007 | Lakkis | .......................... | 370/366 |
| 7,535,819 B1 * | 5/2009 | Larsson et al. | ................. | 370/208 |
| 7,835,262 B2 * | 11/2010 | Balakrishnan et al. | ....... | 370/207 |
| 2002/0085641 A1 | 7/2002 | Baum | | |

(Continued)

FOREIGN PATENT DOCUMENTS

EP    0 966 135 A2    12/1999

(Continued)

OTHER PUBLICATIONS

Seung Young Park et al: "Interference resilient transmission scheme for multiband ofdm system in uwb channels" Circuits and Systems, 2004. ISCAS '04. Proceedings of the 2004 International Symposium on Vancouver, BC, Canada May 23-26, 2004, Piscatavvay, NY, USA, IEEE, US, vol. 5, May 23, 2004, pp. 373-376, XP010719534 ISBN: 0-7803-8251-X.

(Continued)

*Primary Examiner* — Shuwang Liu
*Assistant Examiner* — Helene Tayong
(74) *Attorney, Agent, or Firm* — Sughrue Mion, PLLC

(57) ABSTRACT

A TFI-OFDM transmission system for a UWB communication that includes a data generator generating data having a rate corresponding to a transmission speed mode, a convolutional encoder convolutional-encoding the data into a certain number of data groups, an OFDM modulator outputting OFDM symbols by executing an IFFT the data groups a buffer temporarily storing the OFDM symbols to sequentially transmit the OFDM symbols in a time domain at least two times, and a frequency generator generating certain frequencies to transmit the OFDM symbols in a certain number of frequency bands corresponding to transmission channels.

23 Claims, 8 Drawing Sheets

U.S. PATENT DOCUMENTS

| | | | |
|---|---|---|---|
| 2002/0172183 A1 | 11/2002 | Eichinger et al. | |
| 2003/0018839 A1* | 1/2003 | Ishida | 710/71 |
| 2004/0032354 A1* | 2/2004 | Knobel et al. | 341/133 |
| 2004/0151109 A1* | 8/2004 | Batra et al. | 370/208 |
| 2004/0178934 A1* | 9/2004 | Balakrishnan et al. | 341/80 |
| 2004/0228269 A1* | 11/2004 | Balakrishnan et al. | 370/208 |
| 2006/0182043 A1* | 8/2006 | Mucke | 370/254 |
| 2006/0239334 A1* | 10/2006 | Kwon et al. | 375/132 |

FOREIGN PATENT DOCUMENTS

| | | |
|---|---|---|
| EP | 1265402 A2 | 12/2002 |
| JP | 11-355178 A | 12/1999 |
| JP | 3962399 B2 | 5/2007 |

OTHER PUBLICATIONS

Anuj Batra et al., Texas Instruments, Inc., "TI Physical Layer Proposal for IEEE 802.15 Task Group 3a", IEEE P802.15-03/142 Wireless Personal Area Networks, Nov. 2006, pp. 1-70.

Anuj Batra et al., "Physical Layer Proposal for IEEE 802.15 Task Group 3a", Working Group for Wireless Personal Area Networks, May 12, 2003, pp. 1-38, Dallas, Texas.

Japanese Office Action issued May 11, 2010, in counterpart Japanese Application No. 2007-035091.

Anuj Batra et al., Texas Instruments, Inc., "TI Physical Layer Proposal for IEEE 802.15 Task Group 3a", IEEE P802.15 Wireless Personal Area Networks, May 2003, pp. 1-75.

* cited by examiner

EQUIVALENT
CONVOLUTIONAL ENCODER

EQUIVALENT CODING RATE IS 1/2

CH #1

CH #2

CH #3

CH #4

TFI-OFDM TRANSMISSION/RECEPTION SYSTEMS FOR UWB COMMUNICATION AND METHODS THEREOF FOR MITIGATING INTERFERENCE FROM SIMULTANEOUSLY OPERATING PICONETS

CROSS-REFERENCE TO RELATED APPLICATIONS

This application claims the benefit of U.S. Provisional Application No. 60/486,414, filed on Jul. 14, 2003 in the United States Patent and Trademark Office, and Korean Patent Application No. 2004-21276, filed on Mar. 29, 2004 in the Korean Patent Office, the disclosures of which are incorporated herein by reference in their entirety.

BACKGROUND OF THE INVENTION

1. Field of The Invention

The present invention relates to TFI-OFDM transmission and reception systems and methods thereof for mitigating interference from adjacent piconets in multi-band orthogonal frequency division multiplexing for ultra wide band (UWB) transmissions.

2. Description of the Related Art

In a wireless communication environment utilizing a wide frequency band, such as the ultra wide band (UWB) 3.1~10.6 GHz, the entire frequency band is divided into a single sub-band or a finite number of sub-bands. A continuous wave is not used in a time domain, of which signals exist in every time domain, but rather, a form of a wave packet is used, of which signals exist in a certain region of the time domain. In a single band system that uses a single frequency band, an impulse utilizing every frequency of the UWB is adopted for transmitting and receiving signals. However, the single band system tends to be vulnerable to interference from other systems. To address this shortcoming, a multi-band system utilizes a plurality of sub-bands as the need arises to effectively cope with the interference. However, when using a RF circuit consisting of a single oscillator, the performance of the multi-band system may be seriously degraded since the energy furnished from the multi-path fading channel reaches about 20% of the entire energy. To overcome this shortcoming, the Texas Instrument (TI) Co. suggested a time frequency interleaved-orthogonal frequency division multiplexing (TFI-OFDM) system for the transmission scheme.

FIGS. 1A and 1B illustrate data spectrums in the frequency domain which are transmitted according to the conventional TFI-OFDM transmission scheme.

FIG. 1A illustrates a 55 Mbps mode of the transmission scheme, in which only a half (½) of the positive frequency domain carries actual data, and the remaining half (½) of the positive domain carries a copy of the actual data. The negative frequency domain carries a complex conjugate of the data in the positive domain. FIG. 1B illustrates 110 Mbps and 200 Mbps modes, in which the positive frequency domain carries the actual data and the negative frequency domain carries the complex conjugate of the actual data.

FIG. 2 illustrates a transmission scheme extended in the frequency domain according to the conventional TFI-OFDM transmission system. Shortcomings of the conventional transmission system are described with reference to FIG. 2. Piconet A has a transmission channel $\{f_1, f_2, f_3, f_1, f_2, f_3, \ldots\}$ and piconet B has a transmission channel $\{f_3, f_2, f_1, f_3, f_2, f_1, \ldots\}$ by using three frequency bands $f_1, f_2, f_3$. As shown in FIG. 2, piconets A and B collide with each other. For example, the OFDM symbol A2 of piconet A, which is transmitted in the frequency band $f_2$, collides with the OFDM symbol B2 of piconet B. The collided OFDM symbols cannot be recovered at a receiving side.

Accordingly, there is a need to mitigate the effect of collisions resulting from adjacent simultaneously operating piconets (SOPs) in the convention TFI-OFDM system.

SUMMARY OF THE INVENTION

To address the above and other shortcomings, an aspect of the present invention is to provide a TFI-OFDM transmission system and method thereof for loading and transmitting different data in a positive and a negative frequency domain and applying a transmission scheme of time domain extension, and another aspect is to provide a corresponding TFI-OFDM reception system and method thereof.

To achieve the above aspects of the present invention, the TFI-OFDM transmission system includes a data generator generating data having a speed corresponding to a transmission speed mode; a convolutional encoder convolutional-encoding the data; an interleaver bit-interleaving the encoded data; an OFDM modulator inputting a first data group into a positive frequency domain and a second data group into a negative frequency domain, executing an IFFT, and outputting OFDM symbols; a buffer temporarily storing the OFDM symbols in order to sequentially transmit the OFDM symbols in a time domain at least two times; and a frequency generator generating certain frequencies to transmit the OFDM symbols in a certain number of frequency bands corresponding to transmission channels.

Advantageously, the convolutional encoder has a 1/3 coding rate and outputs first, second, and third data groups which are respectively encoded in first, second, and third generators. The interleaver executes a tone-interleaving with respect to each of the first, second, and third data groups.

According to another aspect of the present invention, the TFI-OFDM transmission method includes (a) generating data having a rate corresponding to a transmission speed mode; (b) convolutional-encoding the data; (c) bit-interleaving the encoded data (d) inputting a first data group into a positive frequency domain and a second data group into a negative frequency domain, executing an inverse fast Fourier transform (IFFT), and outputting OFDM symbols; (e) sequentially transmitting the OFDM symbols in different frequency bands at least two times.

Advantageously, step (b) encodes at a 1/3 coding rate and outputs first, second, and third data groups. Step (c) executes a tone-interleaving to each of the first, second, and third data groups.

The TFI-OFDM reception system includes a receiver receiving OFDM symbols transmitted in a certain number of frequency bands corresponding to transmission channels, a collision detector determining collisions of at least two OFDM symbols by measuring the powers with respect to at least two OFDM symbols sequentially received and containing the same data, and a data detector detecting data to be processed based on collision information which is determined with respect to the at least two OFDM symbols by the collision detector.

The collision detector measures a first power and a second power with respect to first OFDM symbols and second OFDM symbols which are the same data sequentially received from a first frequency band and a second frequency band; measures a first average power and a second average power with respect to signals received from the first and second frequency bands; compares the first power and the first average power, compares the second power and the second average power, determines whether there are collisions in the first OFDM symbols and second OFDM symbols, and provides the information to the data detector.

According to yet another aspect of the present invention, the TFI-OFDM reception method includes (a) receiving OFDM symbols transmitted in a certain number of frequency bands corresponding to transmission channels; (b) determining collisions in at least two OFDM symbols by measuring the powers with respect to the at least two OFDM symbols sequentially received and containing the same data; and (c) detecting data to be processed from the at least two OFDM symbols based on the collision determination.

Step (b) includes (b-1) measuring a first power and a second power with respect to a first OFDM symbols and a second OFDM symbols which are the same data sequentially received from a first frequency band and a second frequency band; (b-2) measuring a first average power and a second average power with respect to each signal received from the first frequency band and second frequency band; and (b-3) comparing the first power and the first average power, comparing the second power and the second average power, determining whether there are collisions in the first OFDM symbols and second OFDM symbols, and providing the information to step (c).

A time frequency interleaved-orthogonal frequency division multiplexing (TFI-OFDM) transmission system for an ultra wide band (UWB) communication, comprises a data generator generating data having a rate corresponding to a transmission speed mode; a convolutional encoder convolutional-encoding the data into a certain number of data groups; an OFDM modulator outputting OFDM symbols by executing an inverse fast Fourier transform (IFFT) the data groups; a buffer temporarily storing the OFDM symbols to transmit the OFDM symbols in different frequencies bands at least two times; and a frequency generator generating certain frequencies to transmit the OFDM symbols in a certain number of frequency bands corresponding to transmission channels.

The transmission system further comprises an interleaver bit-interleaving and outputting the data encoded by the convolutional encoder to the OFDM modulator. The IFFT modulation divides and modulates the interleaved data groups in a certain fashion to correspond to positive and negative frequency domains respectively.

The transmission speed mode is one of 106.7 Mbps mode, 160 Mbps mode and 200 Mbps mode.

If the transmission speed mode is the 106.7 Mbps mode, the convolutional encoder has a 1/3 coding rate and outputs first, second and third data groups respectively. If the transmission speed mode is the 160 Mbps mode, the convolutional encoder has a 1/2 coding rate and outputs first, second and third data groups respectively.

If the transmission speed mode is the 200 Mbps mode, the convolutional encoder has a 5/8 coding rate.

A transmission method of a time frequency interleaved-orthogonal frequency division multiplexing (TFI-OFDM) reception system for an ultra wide band (UWB) communication, comprises generating data having a speed corresponding to a transmission speed mode; convolutional-encoding the data into a certain number of data groups; and bit-interleaving the encoded data; sequentially transmitting OFDM symbols that are introduced by executing the data groups with an inverse fast Fourier transform (IFFT) in different frequencies bands, respectively, at least two times.

The transmission method further comprises bit-interleaving the encoded data before the IFFT modulation. The IFFY modulation divides the interleaved data groups to correspond to a positive frequency domain and a negative frequency domain, respectively, in a certain fashion. The sequential transmission buffers and re-transmits the OFDM symbols once transmitted.

The transmission speed mode is one of 106.7 Mbps mode, 160 Mbps mode and 200 Mbps mode. If the transmission speed mode is the 106.7 Mbps mode, the convolutional encoding has a 1/3 coding rate and outputs first, second and third data groups respectively. If the transmission speed mode is the 160 Mbps mode, the convolutional encoding has a 1/2 coding rate and outputs first, second and third data groups respectively. If the transmission speed mode is the 200 Mbps mode, the convolutional encoding has a 5/8 coding rate.

A transmission method of a time frequency interleaved-orthogonal frequency division multiplexing (TFI-OFDM) transmission system for a ultra wide band (UWB) communication, comprises (a) generating data having a speed corresponding to a transmission speed mode; (b) convolutional-encoding the data into a certain number of data groups; (c) bit-interleaving the encoded data; (d) outputting OFDM symbols by acquiring a complex conjugate for each of the interleaved data groups and executing an inverse fast Fourier transform (IFFT) the data groups to correspond to positive and negative frequency domains together with the complex conjugates in a certain fashion; (e) sequentially transmitting the OFDM symbols in different frequency bands at least two times. The transmission speed mode is one of 39.4 Mbps mode, 53.3 Mbps mode and 80 Mbps mode.

A time frequency interleaved-orthogonal frequency division multiplexing (TFI-OFDM) reception system for a ultra wide band (UWB) communication, comprises a receiver receiving OFDM symbols transmitted in a certain number of frequency bands corresponding to transmission channels; a collision detector determining collisions of at least two of the OFDM symbols by measuring powers with respect at least two of the OFDM symbols sequentially received and containing the same data; and a data detector detecting data to be processed based on the collision which is determined with respect to the at least two of the OFDM symbols by the collision detector.

The collision detector measures a first and a second power with respect to the same OFDM symbols sequentially received from a first frequency band and a second frequency band, measures a first average power and a second average power with respect to signals received from the first frequency band and the second frequency band, compares the first power and the first average power, compares the second power and the second average power, determines collisions in the OFDM symbols of the first frequency band and the second frequency band, and provides collision information to the data detector.

A reception method of a time frequency interleaved-orthogonal frequency division multiplexing (TFI-OFDM) reception system for an ultra wide band (UWB) communication, comprises (a) receiving OFDM symbols transmitted in a certain number of frequency bands corresponding to transmission channels; (b) determining collisions in at least two of the OFDM symbols by measuring powers with respect to the at least two OFDM symbols sequentially received and containing the same data; and (c) detecting data to be processed from the at least two of the OFDM symbols based on the collision determination.

The step (b) comprises (b-1) measuring a first power and a second power with respect to the same OFDM symbols sequentially received from a first frequency band and a second frequency band; (b-2) measuring a first average power and a second average power with respect to each signal received from the first frequency band and the second frequency band; and (b-3) comparing the first power and the first average power, comparing the second power and the second average power, determining collisions in the OFDM symbols of the first frequency band and the second frequency band, and providing the collision determination to the step (c).

BRIEF DESCRIPTION OF THE DRAWING FIGURES

These and/or other aspects and advantages of the present invention will be readily apparent and appreciated by describing in detail exemplary embodiments thereof with reference to the accompanying drawings, in which.

DETAILED DESCRIPTION OF ILLUSTRATIVE, NON-LIMITING EMBODIMENTS OF THE INVENTION

Figure 1A:
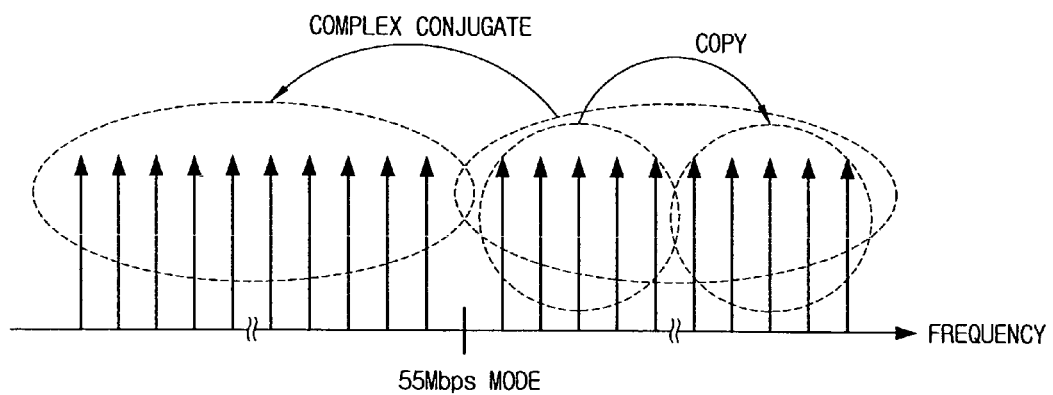
FIGS. 1A and 1B are diagrams illustrating a spectrum in a frequency domain of data transmitted in a conventional TFI-OFDM transmission system.
Figure 1B:
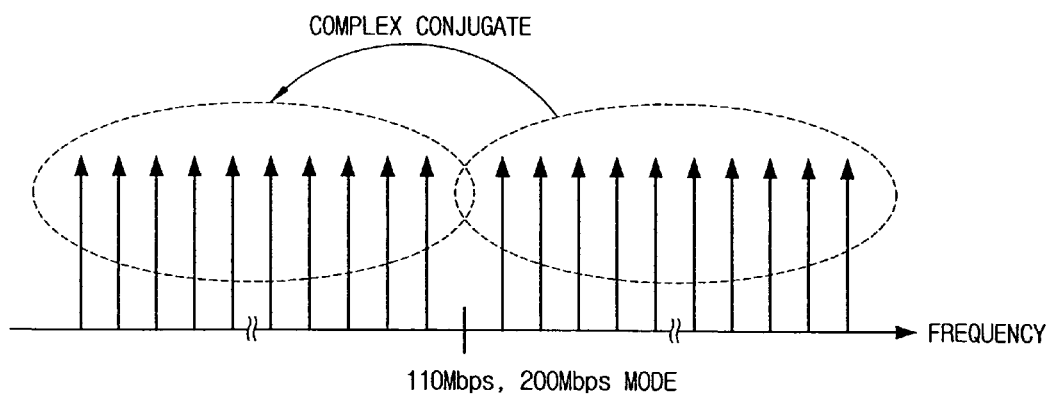

The present invention will now be described more fully with reference to the accompanying drawings, in which illustrative, non-limiting embodiments of the invention are shown. In the drawings, like reference numbers refer to like elements throughout.

Prior to describing the exemplary embodiments of the present invention, it is assumed that a time frequency interleaved-orthogonal frequency division multiplexing (TFI-OFDM) system utilizes a 1/3 convolutional encoder, an applicable transmission speed mode is 110 Mbps and 200 Mbps, and a transmission band has three frequency bands $f_1, f_2, f_3$. It should be appreciated that the 1/3 convolutional encoder is exemplary for purposes of explanation and not limitation, as well as the transmission speed.

Figure 3A:
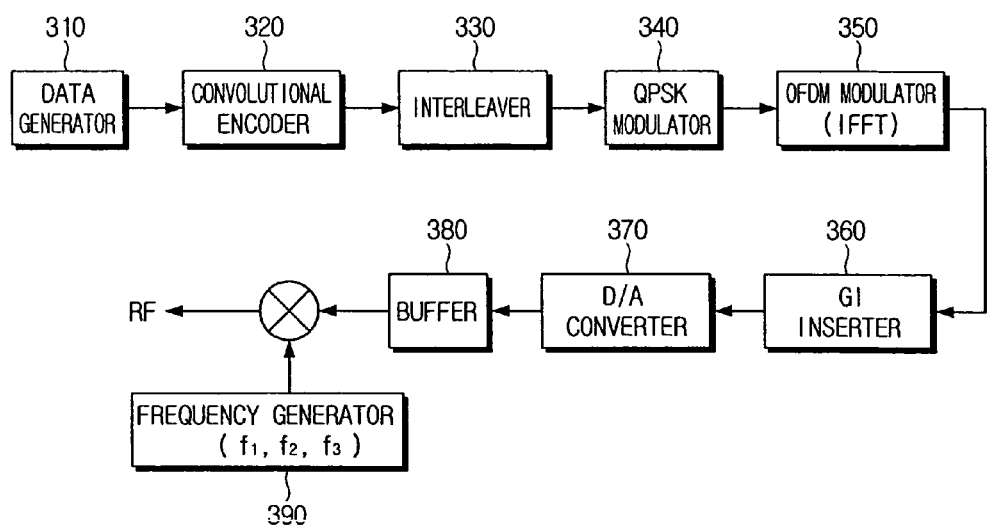
FIG. 3A is a schematic block diagram illustrating a TFI-OFDM transmission system according to an embodiment of the present invention.

FIG. 3A is a schematic block diagram illustrating the TFI-OFDM transmission system according to an embodiment of the present invention. As shown in FIG. 3A, the transmission system includes a data generator 310, a convolutional encoder 320, an interleaver 330, a quadrature phase shifting keying (QPSK) modulator 340, an orthogonal frequency division multiplexing (OFDM) modulator 350, a guard interval (GD) inserter 360, a digital-to-analog (D/A) converter 370, a buffer 380, and a frequency generator 390.

The data generator 310 generates binary data having a ratio corresponding to transmission speed modes, for example, 110 Mbps and 200 Mbps, which is defined in the system.

The convolutional encoder 320 convolutional-encodes an input data at a certain coding rate. For example, a 200-bit input data is output as 600-bit coded data at a 1/3 coding rate.

The interleaver 330 performs symbol interleaving and tone interleaving to the coded data.

The QPSK modulator 340 QPSK-modulates the input data. For instance, if 200-bit data is input, the QPSK modulator 340 outputs 100 symbol data by mapping 2 bits into each symbol.

The OFDM modulator 350 modulates data of a frequency domain into OFDM symbols of a time domain using an inverse fast Fourier transform (IFFT). According to an embodiment of the present invention, the OFDM modulator 350 outputs OFDM symbols in the form of a complex conjugate by inputting different data into the positive and negative frequency domains, respectively, and executing the IFFT. Hence, double the amount of data are transmitted as compared with the OFDM symbols of the time domain in the conventional TFI-OFDM transmission system.

The GI inserter 360 copies a certain interval of a rear part of the IFFT-executed OFDM symbols and inserts the certain interval into a front part of the OFDM symbol so as to maintain orthogonality of the OFDM symbols in multi-path channel conditions. The certain interval inserted into the front of the OFDM symbol is referred to as a guard interval (GI).

The D/A converter 370 converts a digital signal into an analog signal.

The buffer 380 temporarily stores the transmitted OFDM symbols and transmits the same OFDM symbols in the time domain sequentially more than two times, to thus extend the OFDM symbols into the time domain.

The frequency generator 390 generates frequencies corresponding to three frequency bands in accordance with a preset transmission channel pattern. Thus, the OFDM symbols, which are converted to the final analog signals, are up-converted sequentially into predetermined frequency bands.

Accordingly, in the TFI-OFDM transmission system according to an embodiment of the present invention, the OFDM symbols transmit double the data amount as compared with the conventional OFDM symbols, and the data are sequentially transmitted two times in the different frequency bands depending on the transmission channel.

Figure 3B:
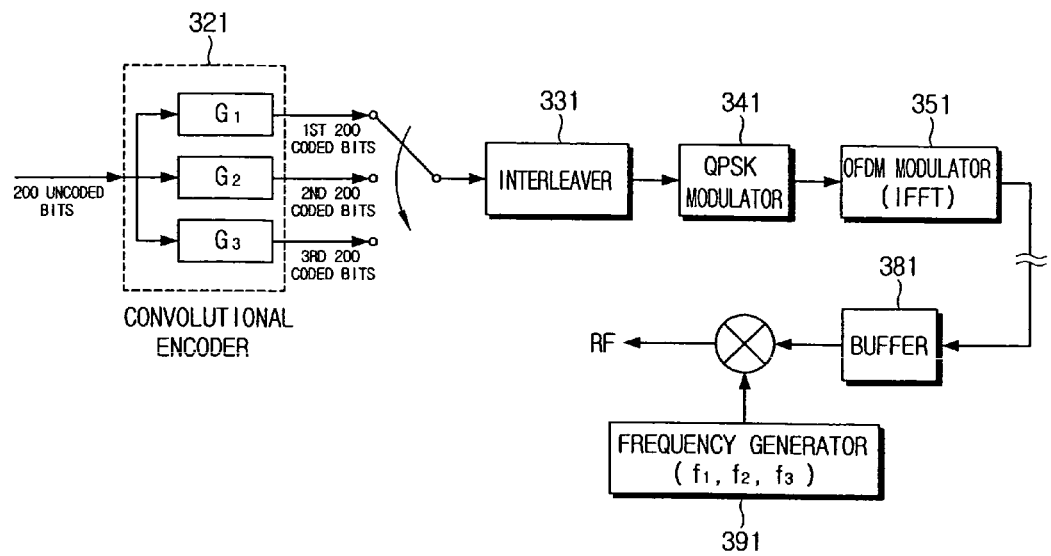
FIG. 3B is a schematic block diagram illustrating the TFI-OFDM transmission system according an alternative embodiment of the present invention.

FIG. 3B is a schematic block diagram illustrating the TFI-OFDM transmission system according an alternative embodiment of the present invention. Detailed descriptions of like elements in the FIG. 3A are omitted for conciseness.

The transmission system includes a convolutional encoder 321, an interleaver 331, a QPSK modulator 341, an OFDM modulator 351, a buffer 381, and a frequency generator 391.

The convolutional encoder 321 has a 1/3 coding rate and, accordingly, includes three generator polynomials (hereinafter referred to as first, second, and third generators). The first, second, and third generators G1, G2 and G3 each output the encoded data. If 200-bit data is input, the first, second, and third generators G1, G2, and G3 each outputs 200-bit coded first, second, and third data groups, respectively.

The interleaver 331 omits the symbol interleaving and performs the tone interleaving alone with respect to the first, second, and third data groups respectively output from the first, second, and third generators G1, G2, and G3 of the convolutional encoder 320.

The QPSK modulator 341 performs the QPSK modulation to the tone-interleaved first, second, and third data groups.

The OFDM modulator 351 modulates data of the frequency domain into OFDM symbols of the time domain through the IFFT. According to an alternative embodiment of the present invention, the OFDM modulator 351 inputs different data into the positive and the negative frequency domains, respectively, and executes the IFFT to the input data. In detail, the OFDM modulator 351 receives different data of the first data group to the positive and negative frequency domains, respectively, and generates one OFDM symbol corresponding to the first data group. This process applies to the data of the second and the third data groups.

Subsequently, a GI is inserted into the OFDM symbols and the OFDM symbols are converted to an analog signal.

The buffer 381 temporarily stores the OFDM symbols to extend the OFDM symbols into the time domain. Hence, the same OFDM symbols are sequentially transmitted in the time domain at least two times. The frequency generator 391 generates frequencies corresponding to the three frequency bands $f_1$, $f_2$, $f_3$ in accordance with the predetermined transmission channel pattern.

The final analog-converted OFDM symbols are sequentially up-converted two times to a certain frequency band. For example, if the transmission channel is $\{f_1, f_2, f_3 f_1, f_2, f_3\}$, the final analog-converted OFDM symbols are transmitted once in the frequency domain $f_1$ at the time $T_0$, temporarily stored in the buffer 380, and transmitted once again in the frequency domain $f_2$ at the next time $T_1$.

The above descriptions are made with respect to the 110 Mbps and 200 Mbps modes. As for a 55 Mbps mode, the OFDM modulator 350 or 351 utilizes a different data input scheme. Specifically, a half (½) of the positive frequency domain is input with actual first data, and the remaining half (½) of the positive frequency domain is input with the same data which is the copy of the actual first data. Similarly, a half (½) of the negative frequency domain is input with actual second data, and the remaining half (½) of the negative frequency domain is input with the copy of the actual second data. These loaded data are IFFT-executed and output as the OFDM symbols having double the data amount as compared with the conventional OFDM symbols of the 55 Mbps. Next, the OFDM symbols are data-processed and transmitted in the time domain two times as mentioned above. Consequently, the same data transmission rate is obtained as in the 55 Mbps mode. As for a 480 Mbps mode, the conventional transmission scheme is applied.

Figure 4:
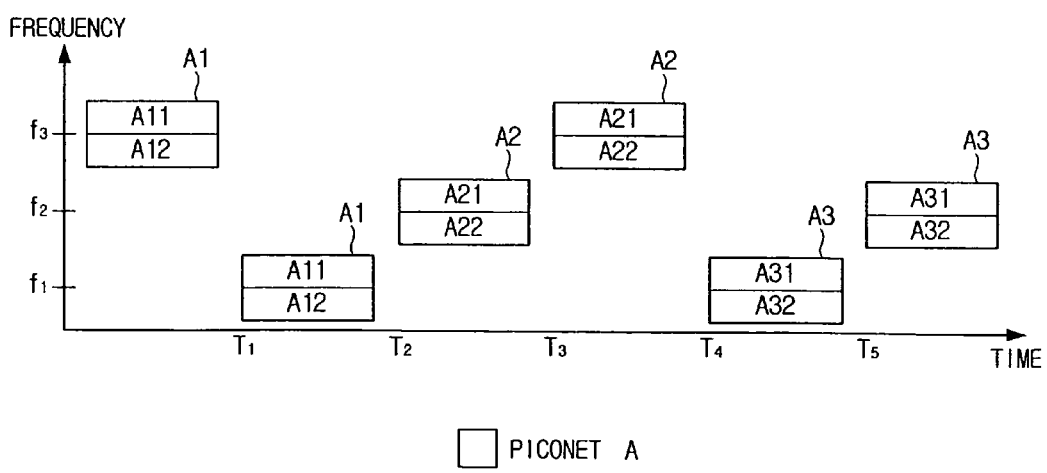
FIG. 4 is a conceptual diagram illustrating the transmission scheme according to an embodiment of the present invention.

FIG. 4 is a conceptual diagram illustrating the transmission scheme extended into the time domain of the TFI-OFDM transmission system according to an embodiment of the present invention, which is described in greater detail below. By way of example, piconet A as described below has the transmission channel pattern $\{f_3, f_1, f_2, f_3, f_1, f_2\}$ with respect to the three frequency bands $\{f_1, f_2, f_3\}$.

As shown in FIG. 4, OFDM symbols loaded in each frequency band contain different data in the positive and negative frequency domains, respectively, and are transmitted two times along the time axis. Specifically, the OFDM symbols A11 and A12, which are initially transmitted in the frequency band $f_3$ at the time $T_0$, are transmitted once again in the frequency band $f_1$ at the time $T_1$. In the same manner, a plurality of the OFDM symbols are transmitted two times in the frequency bands according to the transmission channel pattern. The transmission scheme has the same data transmission rate as the conventional transmission scheme of FIG. 2 with respect to the OFDM symbols transmitted at the times $T_0$ to $T_5$.

Figure 2:
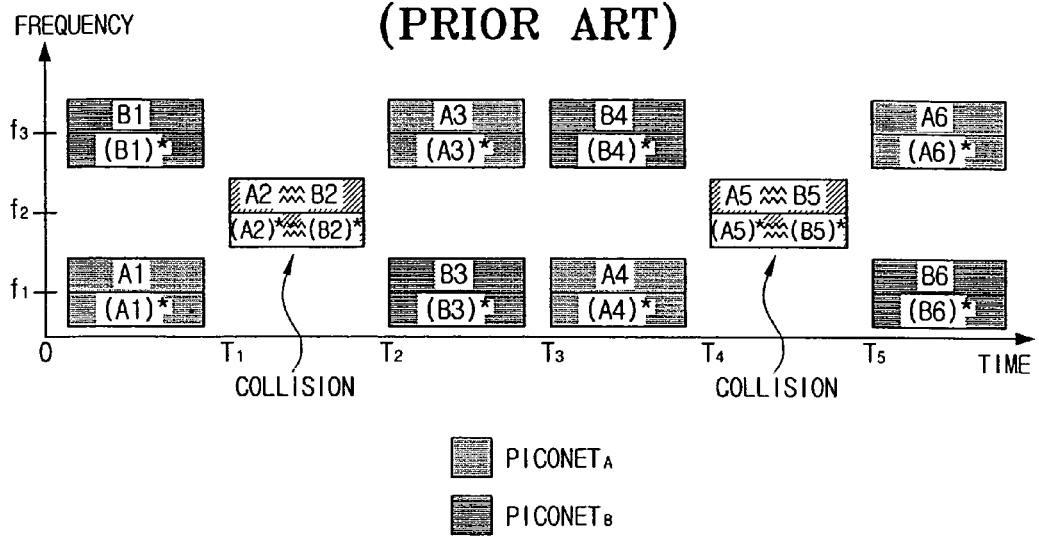
FIG. 2 is a diagram illustrating a transmission scheme extended in the frequency domain of the conventional TFI-OFDM system.
Figure 5:
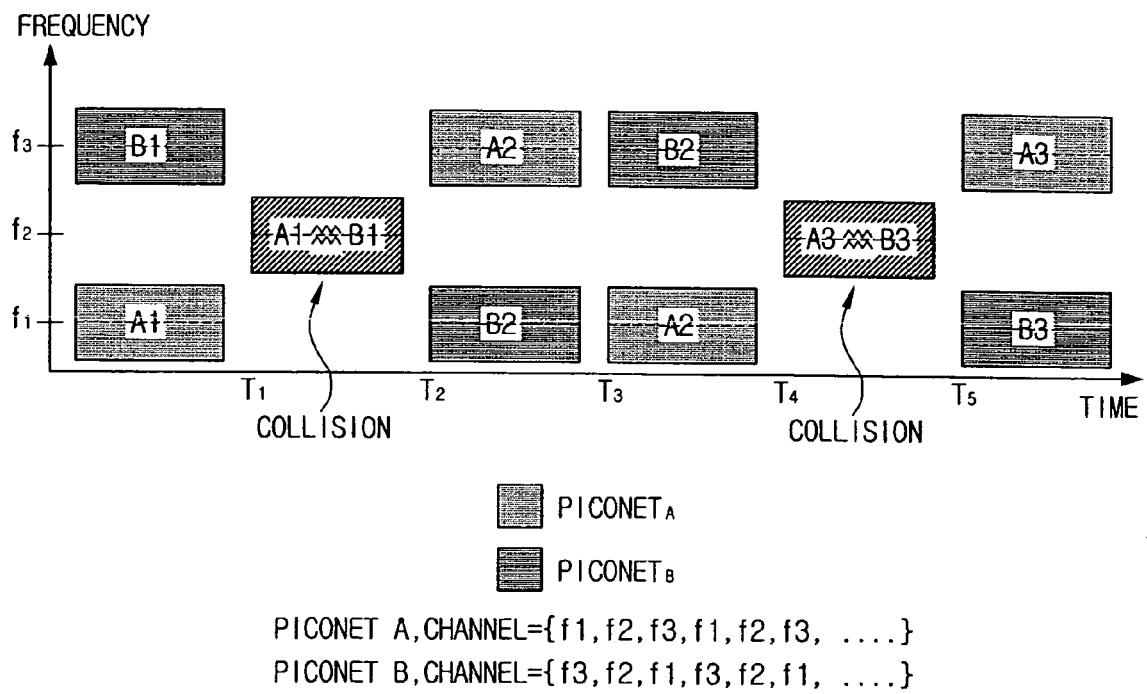
FIG. 5 is a conceptual diagram illustrating inter-symbol collisions in a multi-piconet environment according to an embodiment of the present invention.

FIG. 5 is a conceptual diagram illustrating inter-symbol collisions in a multi-piconet environment according to an embodiment of the present invention, in which performances of adjacent simultaneously operating piconets (SOPs) are enhanced while the same data transmission rate is maintained as in the conventional transmission scheme of FIG. 2.

Referring now to FIG. 5, the transmission channel pattern of piconet A is $\{f_1, f_2, f_3, f_1, f_2, f_3\}$ and that of piconet B is $\{f_3, f_2, f_1, f_3, f_2, f_1\}$ with respect to the three frequency bands $f_1$, $f_2$, $f_3$. The OFDM symbol A1 of piconet A, which is transmitted in the frequency band $f_2$ at the time $T_1$, collides with the OFDM symbol B1 of piconet B. The OFDM symbol A3 of piconet A, which is transmitted in the frequency band $f_2$ at the time $T_4$, collides with the OFDM symbol B3 of piconet B. Accordingly, the inter-symbol collisions are inevitable due to the adjacent SOPs in the multi-piconets.

The transmission scheme extended to the time domain according to an embodiment of the present invention, transmits the same OFDM symbol two times along the time axis so that the collided OFDM symbols A1, B1, A3, and B3 are re-transmitted in other frequency bands at the previous time interval or at the next time interval. As a result, even if an OFDM symbol has collided and is lost, other OFDM symbols are losslessly transmitted since the same OFDM symbols are transmitted two times so that the adjacent SOP performance is definitely enhanced.

Figure 6A:
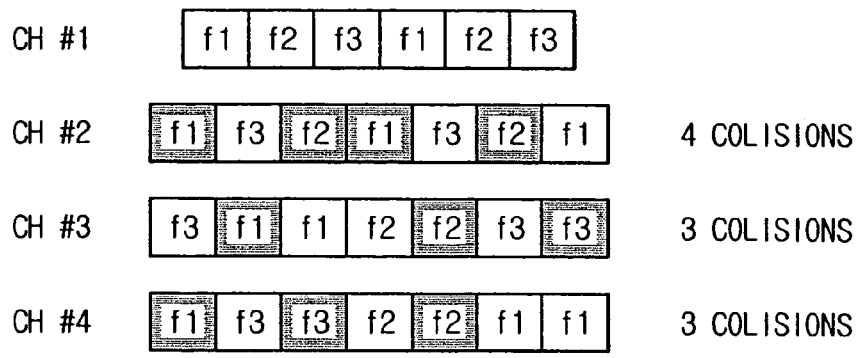
FIGS. 6A to 6C are diagrams illustrating the transmission scheme according to an embodiment of the present invention.
Figure 6B:
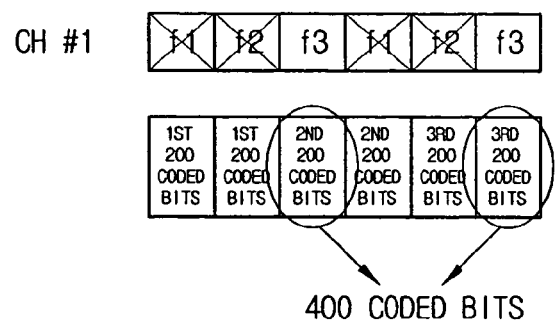
Figure 6C:
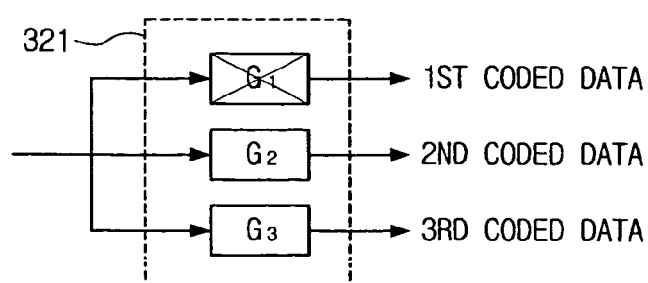

FIGS. 6A to 6C are diagrams illustrating the transmission scheme according to an embodiment of the present invention.

FIG. 6A illustrates a case when each transmission channel CH#2, CH#3, and CH#4 is delayed for 0.5 OFDM symbol with respect to the transmission channel CH#1, which results in collisions between adjacent transmission channels. The transmission channel CH#2 has four symbol collisions with respect to the transmission channel CH#1, and the transmission channels CH#3 and CH#4 each have three symbol collisions with respect to the transmission channel CH#1. Thus, the transmission channel CH#1 experiences the worst channel conditions in the vicinity of the transmission channel CH#2. Referring to FIG. 6B, only 400 bits of data are losslessly transmitted with respect to the transmitted 600-bit data.

If the transmission system of FIG. 3B data-processes the OFDM symbols being transmitted in the transmission channel CH#1, the first OFDM symbols transmitted in the frequency bands $f_1$ and $f_2$ correspond to the first data group output from the first generator G1 of the convolutional encoder 321, second OFDM symbols transmitted in the frequency bands $f_3$ and $f_1$ correspond to the second data group output from the second generator G2, and third OFDM symbols transmitted in the frequency bands $f_2$ and $f_3$ correspond to the third data group output from the third generator G3. Thus, even in the worst channel conditions, only the first OFDM symbols are lost while the second and third OFDM symbols are losslessly transmitted.

Consequently, effects are equivalent to the 1/2 convolutional encoding so that a 1/2 rate of error correction capability is maintained through a 1/2 rate convolutional decoding at a reception side.

FIGS. 7A to 7D are diagrams illustrating examples of the time-domain-extended transmission scheme applied to each of the transmission channel patterns according to an embodiment of the present invention. By way of example, four kinds of the transmission channel pattern are utilized with respect to the three frequency bands $f_1$, $f_2$, $f_3$.

Figure 7A:
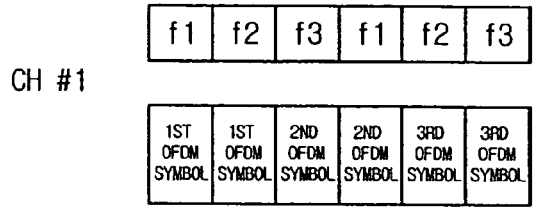
FIGS. 7A to 7D are diagrams illustrating examples of the transmission scheme applied to each of transmission channel patterns according to an embodiment of the present invention.

In the transmission channel CH#1=$\{f_1, f_2, f_3, f_1, f_2, f_3, \ldots\}$ of FIG. 7A, the frequency bands $f_1$ and $f_2$ transmit the first OFDM symbols, the frequency bands $f_3$ and $f_1$ transmit the second OFDM symbols, and the frequency bands $f_2$ and $f_3$ transmit the third OFDM symbols in sequence.

Figure 7B:
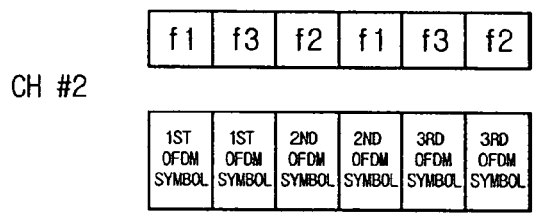

In the transmission channel CH#2={$f_1$, $f_3$, $f_2$, $f_1$, $f_3$, $f_2$, ...} of FIG. 7B, the frequency bands $f_1$ and $f_3$ transmit the first OFDM symbols, the frequency bands $f_2$ and $f_1$ transmit the second OFDM symbols, and the frequency bands $f_3$ and $f_2$ transmit the third OFDM symbols in sequence.

Figure 7C:
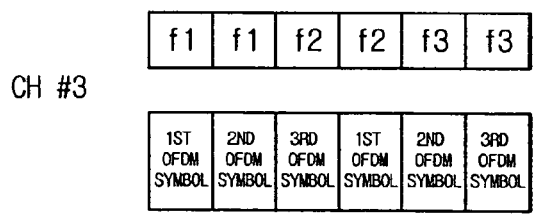

In the transmission channel CH#3={$f_1$, $f_1$, $f_2$, $f_2$, $f_3$, $f_3$, ...} of FIG. 7C, the frequency bands $f_1$, $f_1$, and $f_2$ respectively transmit the first, second, and third OFDM symbols, and the frequency bands $f_2$, $f_3$, and $f_3$ respectively transmit the first, second, and third OFDM symbols once again.

Figure 7D:
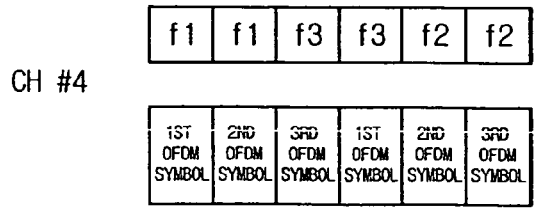

In the transmission channel CH#4={$f_1$, $f_1$, $f_3$, $f_3$, $f_2$, $f_2$, ...} of FIG. 7D, the frequency bands $f_1$, $f_1$, and $f_3$ respectively transmit the first, second, and third OFDM symbols, and the frequency bands $f_3$, $f_2$, and $f_2$ respectively transmit the first, second, and third OFDM symbols once again.

In the light of the foregoing, the TFI-OFDM transmission system according to an embodiment of the present invention transmits the different data loaded in the positive and negative frequency domains, respectively, and transmits the OFDM symbols extended into the time domain. As a result, the data transmission rate becomes the same as the conventional TFI-OFDM transmission scheme and the effects of the collision due to interfering signals from the adjacent SOP is mitigated.

Figure 8:
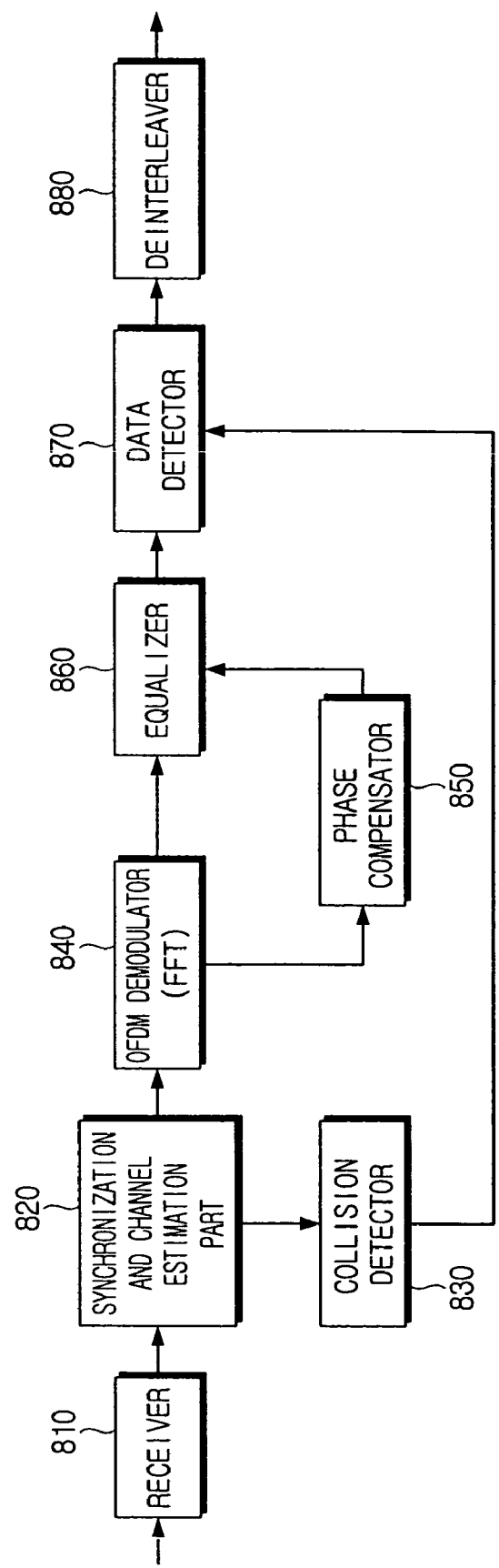
FIG. 8 is a schematic block diagram illustrating a TFI-OFDM reception system corresponding to the transmission scheme according to an embodiment of the present invention.

FIG. 8 is a schematic block diagram illustrating a TFI-OFDM reception system according to an embodiment of the present invention. Referring to FIG. 8, the reception system includes a receiver 810, a synchronization and channel estimation part 820, a collision detector 830, an OFDM demodulator 840, a phase compensator 850, an equalizer 860, a data detector 870, and a deinterleaver 880.

The receiver 810 down-converts a certain number of frequency bands into predetermined transmission channel patterns.

The synchronization and channel estimation part 820 detects a sync signal through cross-correlation between preambles by scanning a specific frequency band of the certain number of the frequency bands. A channel is estimated by using two reference OFDM symbols per one frequency band. For example, for the transmission channel pattern {$f_1$, $f_2$, $f_3$, $f_1$, $f_2$, $f_3$, ...}, OFDM symbols transmitted in the underlined identical frequency band $f_1$ are present at three OFDM-symbol intervals on the time axis. Thus, a phase difference results from a phase offset, timing offset, and frequency offset between two OFDM symbols transmitted in a single frequency band. Accordingly, channels are estimated using the phase difference of two OFDM symbols.

The collision detector 830 determines collisions of OFDM symbols that are transmitted in the multi-path channel conditions. The algorithm for the collision determination can vary. According to an embodiment of the present invention, the collisions are detected by measuring the powers of the received symbols. The steps for the collision determination will follow with reference to FIG. 9.

The OFDM demodulator 840 outputs data of the frequency domain from the OFDM symbols of the time domain that are input with the same specification as in the transmitting end by using the fast Fourier transform (FFT).

The phase compensator 850 compensates the phase of the received signal by utilizing a combination of a reference-based method and a decision-directed method.

The equalizer 860 removes multi-paths of the received signal by generally using a ONE-TAP equalizer according to the OFDM transmission characteristics.

The data detector 870 detects only data to be received and processed based on the determination of the collision detector 830. Preferably, but not necessarily, the data detector 870 detects data which correspond to non-collided OFDM symbols of the same OFDM symbols received twice.

The deinterleaver 880 deinterleaves the detected data of the data detector 870 in the reverse order of interleaving at the transmitting end.

Figure 9:
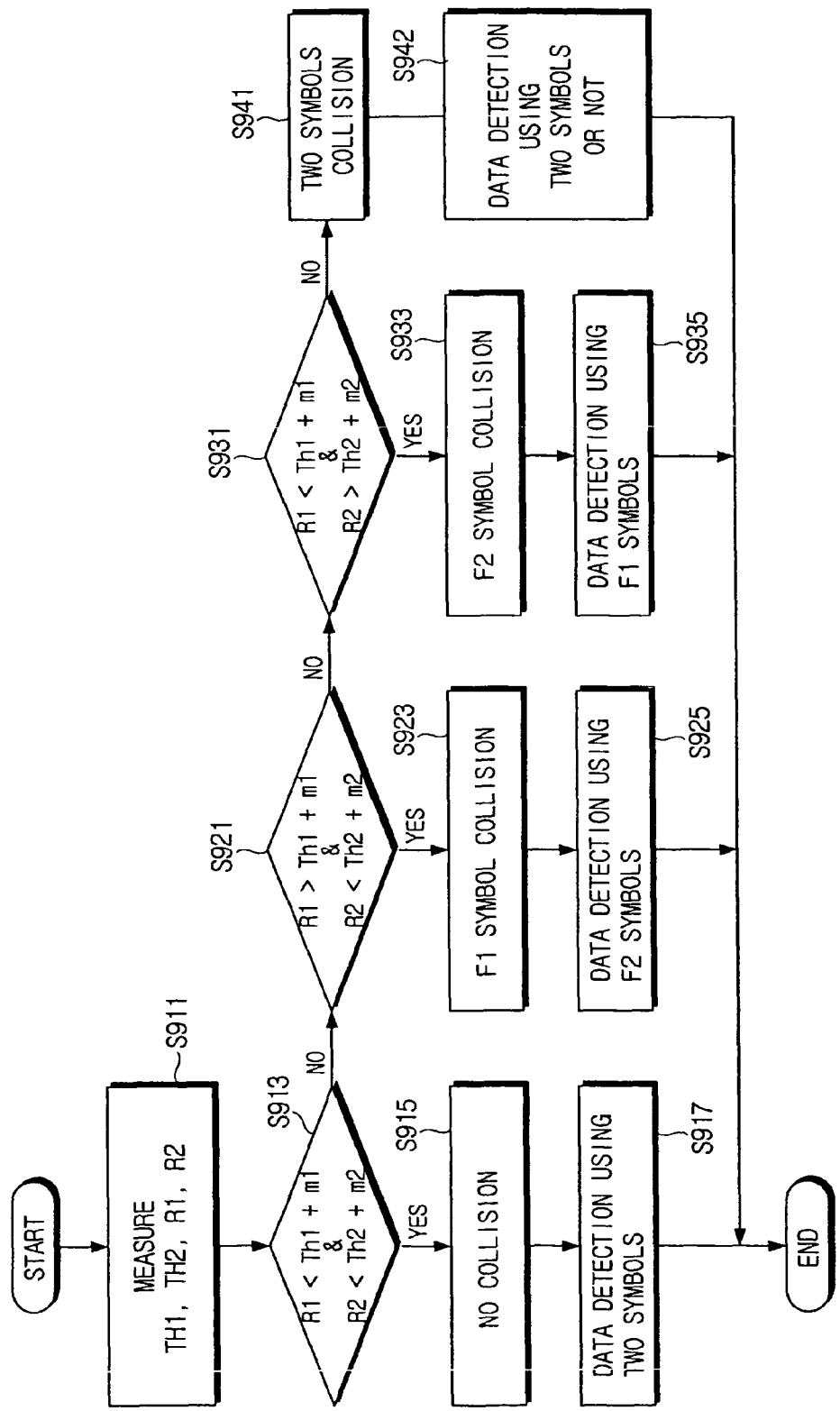
FIG. 9 is a flowchart illustrating exemplary steps for selectively detecting non-collided OFDM symbols in the multi-piconet environment by the TFI-OFDM reception system according to an embodiment of the present invention.

FIG. 9 is a flowchart illustrating exemplary steps for selectively detecting non-collided OFDM symbols in the multi-piconet environment by the collision detector 830 of the TFI-OFDM reception system according to an embodiment of the present invention. In the following example, the collision is detected with respect to the OFDM symbols transmitted in the transmission channel {$f_1$, $f_2$, $f_3$, $f_1$, $f_2$, $f_3$}.

The first OFDM symbols transmitted in the frequency bands $f_1$ and $f_2$ are received in sequence. It is assumed that the first OFDM symbol corresponds to the first data group output from the convolutional encoder 321 of FIG. 3B.

The collision detector 830 measures a power R1 of the first OFDM symbols (hereafter refer to as a 'first power') transmitted in the current frequency band $f_1$ and a power R2 of the first OFDM symbols (hereinafter refer to as a 'second power') transmitted in the next frequency band $f_2$. Next, an average power TH1 is calculated with respect to the OFDM symbols previously transmitted in the frequency band $f_1$ (hereinafter referred to as a 'first average power'), and an average power TH2 is calculated with respect to the OFDM symbols previously transmitted in the frequency band $f_2$ (hereinafter refer to as a 'second average power) at step S911.

The first power R1 is compared with the first average power TH1, and the second power R2 is compared with the second average power TH2 at step S913. If the first power R1 is less than the sum of the first average power TH1 and a margin m1 and the second power R2 is less than the sum of the second average power TH2 and a margin m2, then there are no collisions in the first OFDM symbols transmitted in the frequency band $f_1$ and the first OFDM symbols transmitted in the frequency band $f_2$ (step S915). Hence, the data detector 870 detects the data using both of the first OFDM symbols transmitted in the frequency bands $f_1$ and $f_2$ at step S917.

If the first power R1 is greater than the sum of the first average power TH1 and the margin m1 and the second power R2 is less than the sum of the second average power TH2 and the margin m2 at step S921, then the first OFDM symbols transmitted in the frequency band $f_1$ have collisions (step S923). Accordingly, the data detector 870 detects data by use of the first OFDM symbols transmitted in the frequency band $f_2$ at step S925.

If the first power R1 is less than the sum of the first average power TH1 and the margin m1 and the second power R2 is greater than the sum of the second average power TH2 and the margin m2 at step S931, then the first OFDM symbols transmitted in the frequency band $f_2$ have collisions (step S933). Accordingly, the data detector 870 detects data by use of the first OFDM symbols transmitted in the frequency band $f_1$ at step S935.

If the first power R1 is greater than the sum of the first average power TH1 and the margin m1 and the second power R2 is greater than the sum of the second average power TH2 and the margin m2 at step S931, then there are collisions in both of the first OFDM symbols transmitted in the frequency band $f_1$ and the first OFDM symbols transmitted in the frequency band $f_2$ (step S941). Accordingly, the data detector 870 detects data using both of the first OFDM symbols transmitted in the frequency bands $f_1$ and $f_2$. Alternatively, the data detector 870 may not use both of the first OFDM symbols (step S942).

Referring back to FIG. 3A, if the convolutional encoder 320 performs both of the symbol interleaving and the tone interleaving, the interleaver 330 detects data using two collided OFDM symbols. Referring back to FIG. 3B, if the convolutional encoder 321 performs the tone interleaving alone, the interleaver 331 can correct errors through the convolutional decoding of a 1/2 rate as shown in FIGS. 6B and 6C without having to use the two collided OFDM symbols.

As described, the collision detection is executed with respect to the same OFDM symbols received in sequence.

In the light of the foregoing, the reception performance is enhanced by selectively using the non-collided OFDM symbols in the multi-piconet environment for the data reception.

The TFI-OFDM transmission system according to an embodiment of the present invention OFDM-modulates the different data in the positive and negative frequency domains and transmits the modulated OFDM symbols in the time domain at least two times, to thus mitigate the collisions resulting from the adjacent SOPs in the multi-piconet environment.

The TFI-OFDM reception system according to an embodiment of the present invention selectively utilizes the non-collided OFDM symbols for data reception in the multi-piconet environment.

While the embodiments of the present invention have been described with reference to exemplary embodiments thereof, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A transmission method of a time frequency interleaved-orthogonal frequency division multiplexing (TFI-OFDM) transmission system for ultra wide band (UWB) communication, comprising:
   (a) generating data having a speed corresponding to a transmission speed mode;
   (b) convolutional-encoding the data into a number of data groups;
   (c) bit-interleaving the convolutional-encoded data to generate interleaved data groups;
   (d) outputting OFDM symbols by acquiring a complex conjugate for each of the interleaved data groups and executing an inverse fast Fourier transform (IFFT) on the interleaved data groups to correspond to positive and negative frequency domains together with the complex conjugates in a predetermined manner; and
   (e) sequentially transmitting the OFDM symbols in a pattern of different continuative frequency bands at least two times;
       wherein the OFDM symbol contains a predetermined data group in a positive frequency band and a copy of the predetermined data group in a negative frequency band;
       wherein the pattern of different continuative frequency bands comprises a first frequency band and a second frequency band that is continuous with the first frequency band within the pattern.

2. The transmission method of claim 1, wherein the transmission speed mode is one of 39.4 Mbps mode, 53.3 Mbps mode and 80 Mbps mode.

3. A time frequency interleaved-orthogonal frequency division multiplexing (TFI-OFDM) transmission system for ultra wide band (UWB) communication, comprising:
   a data generator which generates data having a rate corresponding to a transmission speed mode;
   a convolutional encoder which convolutional-encodes the data into a number of data groups;
   an OFDM modulator which outputs OFDM symbols by executing an inverse fast Fourier transform (IFFT) on the data groups;
   a buffer which temporarily stores the OFDM symbols to transmit the OFDM symbols in different frequency bands at least two times; and
   a frequency generator which generates a pattern of frequencies to transmit the OFDM symbols in a number of frequency bands corresponding to transmission channels;
   wherein the OFDM symbols are initially transmitted at a first frequency at a first time, and are re-transmitted at a second frequency that is continuous within the pattern with the first frequency in the pattern at a second time;
   wherein the OFDM symbol contains a predetermined data group in a positive frequency band and a copy of the predetermined data group in a negative frequency band.

4. The transmission system of claim 3, further comprising an interleaver bit which interleaves the data encoded by the convolutional encoder and outputs interleaved data groups to the OFDM modulator.

5. The transmission system of claim 4, wherein the executing the IFFT comprises performing an IFFT modulation and the IFFT modulation divides and modulates the interleaved data groups in a predetermined manner to correspond to positive and negative frequency domains.

6. The transmission system of claim 4, wherein the transmission speed mode is one of 106.7 Mbps mode, 160 Mbps mode and 200 Mbps mode.

7. The transmission system of claim 6, wherein, if the transmission speed mode is the 106.7 Mbps mode, the convolutional encoder performs convolutional-encoding at a 1/3 coding rate and outputs first, second and third data groups.

8. The transmission system of claim 6, wherein, if the transmission speed mode is the 160 Mbps mode, the convolutional encoder performs convolutional-encoding at a 1/2 coding rate and outputs first, second and third data groups.

9. The transmission system of claim 6, wherein, if the transmission speed mode is the 200 Mbps mode, the convolutional encoder performs convolutional-encoding at a 5/8 coding rate.

10. A transmission method of a time frequency interleaved-orthogonal frequency division multiplexing (TFI-OFDM) transmission system, comprising:
    generating a first data having a rate corresponding to a transmission speed mode;
    generating transmission data using the generated first data; and
    generating an OFDM symbol by executing an inverse fast Fourier transform on the transmission data and transmitting the OFDM symbol in a pattern of different continuative frequencies at least two times in a time domain,
    wherein the OFDM symbol contains a predetermined data group in a positive frequency domain and a copy of the predetermined data group in a negative frequency domain; and
    wherein transmitting comprises transmitting the OFDM symbols at a first frequency at a first time, and re-transmitting the OFDM symbols at a second frequency that is continuous within the pattern with the first frequency at a second time.

11. The transmission method of claim 10, wherein the OFDM symbol is repeatedly transmitted in different frequency bands.

12. The transmission method of claim 10, wherein the OFDM symbol is repeatedly transmitted in a same frequency band.

13. The transmission method of claim 10, wherein the generating the transmission data comprises:
   coding the generated first data to generate coded data; and
   interleaving the coded data to generate the transmission data.

14. The transmission method of claim 13, wherein the coded data is generated by coding the first data by using convolutional code.

15. The transmission method of claim 10, wherein the transmitting the OFDM symbol comprises initially transmitting the OFDM symbol, buffering the OFDM symbol and re-transmitting the OFDM symbol.

16. The transmission method of claim 10, wherein the transmission speed mode comprises one of 106.7 Mbps mode, 160 Mbps mode and 200 Mbps mode.

17. A transmission method of a time frequency interleaved-orthogonal frequency division multiplexing (TFI-OFDM) transmission system, comprising: generating an OFDM symbol in which a data having a speed corresponding to a transmission speed mode is constructed to be transmitted at a first frequency at a first time, and transmitted at a second frequency at a second time; and
   transmitting the generated OFDM symbol in a pattern of different continuative frequencies in a time domain at least twice;
   wherein the OFDM symbol contains a predetermined data group in a positive frequency domain and a copy of the predetermined data group in a negative frequency domain; and
   wherein the first frequency and the second frequency are continuous within the pattern.

18. A transmission method of a time frequency interleaved-orthogonal frequency division multiplexing (TFI-OFDM) transmission system, comprising:
   transmitting an OFDM symbol which is generated by using a data having a speed corresponding to a transmission speed mode; and
   after transmitting the OFDM symbol, retransmitting the OFDM symbol at least once in different time bands,
   wherein the OFDM symbol contains a predetermined data group in a positive frequency domain and a copy of the predetermined data group in a negative frequency domain;
   wherein the OFDM symbols are transmitted according to a pattern of frequencies in which the OFDM symbols are initially transmitted at a first frequency at a first time, and are re-transmitted at a second frequency that is continuous within the pattern with the first frequency at a second time.

19. The transmission method of claim 17, wherein the OFDM symbol contains a first data group in a positive frequency domain and a second data group in a negative frequency domain, and
   wherein the second data group is a copy of the first data group.

20. The transmission method of claim 17, wherein the OFDM symbol contains a first data group in a positive frequency domain and a second data group in a negative frequency domain,
   the second data group is a complex conjugate of the first data group.

21. The transmission method of claim 17, wherein the OFDM symbol contains a first data group in a half(½) of a positive frequency domain and a copy of the first data group in a remaining half(½) of the positive frequency domain, and a second data group in a half(½) of a negative frequency domain and a copy of the second data group in a remaining half(½) of the negative frequency domain.

22. The transmission method of claim 17, wherein the transmission speed mode is 53.3 Mbps mode.

23. The transmission method of claim 18, wherein the transmission speed mode is 53.3 Mbps mode.

* * * * *